United States Patent [19]
Tillotson et al.

[11] Patent Number: 5,205,112
[45] Date of Patent: Apr. 27, 1993

[54] MULTI-BLADED MULCHING/BAGGING MOWER

[75] Inventors: Henry B. Tillotson, Minneapolis; James R. Baumann, Saint Louis Park, both of Minn.

[73] Assignee: The Toro Company, Minneapolis, Minn.

[21] Appl. No.: 854,168

[22] Filed: Mar. 20, 1992

[51] Int. Cl.⁵ .................. A01D 34/66; A01D 34/73
[52] U.S. Cl. ................................. 56/2; 56/6; 56/13.6; 56/17.5; 56/320.2; 56/DIG. 17
[58] Field of Search .............. 56/2, 6, 320.2, 320.1, 56/13.6, 17.5, 255, 295, DIG. 17

[56] References Cited

U.S. PATENT DOCUMENTS

| | | | |
|---|---|---|---|
| 3,234,719 | 2/1966 | Rank | 56/320.2 X |
| 3,245,209 | 4/1966 | Marek | 56/13.6 X |
| 4,055,036 | 10/1977 | Kidd | 56/320.2 |
| 4,226,074 | 10/1980 | Mullet | 56/320.2 |
| 4,364,221 | 12/1982 | Wixom | 56/320.2 X |
| 4,951,449 | 8/1990 | Thorud | 56/2 |
| 5,035,108 | 7/1991 | Meyer et al. | 56/13.4 |
| 5,090,183 | 2/1992 | Thorud et al. | 56/2 |
| 5,129,217 | 7/1992 | Loehr | 56/13.6 |
| 5,133,176 | 7/1992 | Baumann et al. | 56/320.1 X |

Primary Examiner—Stephen J. Novosad
Attorney, Agent, or Firm—James W. Miller

[57] ABSTRACT

A multi-bladed mulching mower is convertible between a mulching mode in which the grass clippings are deposited as mulch or a discharge/collection mode in which the grass clippings are discharged from the housing or are bagged. The mower includes two separate cutting chambers which are staggered forwardly relative to one another but otherwise are arranged side-by-side next to one another. The peripheral wall of the forward cutting chamber has a selectively openable gate which is closed in the mulching mode but is opened in the discharge/collection mode. The rearward cutting chamber is provided with a discharge outlet which can be selectively opened in the discharge/collection mode but is otherwise closed. When the gate and discharge outlet are opened and the mower is operating in the discharge/collection mode, the grass clippings in the forward cutting chamber are deposited onto the ground in advance of the rearward cutting chamber to be picked up and evacuated by the blade in the rearward cutting chamber as the rearward cutting chamber passes over the clippings during forward movement of the mower.

20 Claims, 2 Drawing Sheets

MULTI-BLADED MULCHING/BAGGING MOWER

TECHNICAL FIELD

This invention relates to a mower having a plurality of cutting blades carried by a cutting deck. More specifically, the present invention relates to such a mower which is convertible between a mulching mode and a grass discharge/collection mode.

BACKGROUND OF THE INVENTION

Walk-behind lawn mowers are known having a housing supported for movement over the ground by a plurality of wheels. A single cutting blade rotates horizontally in a cutting chamber located within the housing. The user pushes or guides the mower by holding an upwardly extending handle assembly connected to the mower housing. The cutting blade cuts grass as the mower travels over the ground.

The grass clippings are often discharged through a side or rear discharge opening in the mower housing. A bagging attachment can be removably secured to the discharge opening to allow the grass clippings to be collected in the attachment. The bagging attachment can be removed from the mower housing to allow the clippings to be dumped.

Mulching mowers are known in which the usual side or rear discharge opening from the housing is absent. These "dedicated" mulchers generally have included a cutting chamber which is enclosed over the sides and top thereof and which is open only at the bottom. This allows the grass clippings cut by the blade to be deposited downwardly into the cut grass path through the open bottom of the cutting chamber. In some cases, a specially shaped blade assists in the downward movement of the grass clippings, or grass deflector members may be carried inside the cutting chamber. U.S. Pat. No. 4,205,512 to Thorud discloses a prior art "dedicated" mulcher mower utilizing grass deflector members in the cutting chamber.

Interest has grown recently in the use of mulching mowers. To that end, The Toro Company, the assignee of the present invention, has designed and introduced a line of rear discharge, walk-behind mowers that are selectively convertible by the user between grass discharging, collection, and mulching modes. The grass discharge opening is selectively blocked by an insertable plug in the grass mulching mode. In addition, these mowers include a plurality of grass deflecting members, also known as kicker members, which intercept the grass clippings circulating inside the housing to assist in their downward discharge from the cutting chamber when the mower is being used as a mulcher. One of these kicker members is located on the plug itself. U.S. Pat. Nos. 4,951,449 and 5,090,183 to Thorud illustrate such a convertible bagger/mulcher.

Many traditional mulching mowers of the kind described above are not well suited for cutting large areas of grass. Such mowers are limited in width and generally use only a single cutting blade. For example, most mowers of this type do not exceed 21 inches in width. Thus, it would be too time consuming and labor intensive to use this type of mower for cutting large areas of grass such as those found on golf courses, parks, and the like.

Mowing machines are known which are specifically designed for cutting relatively large areas of the type just mentioned. These machines include a cutting deck attached to a traction unit that is normally self-propelled for carrying the cutting deck over the ground. The cutting deck is quite wide and includes more than one blade arranged across the width of the deck to provide a wide swath of cut grass for each pass of the mowing machine.

The Toro Company has also introduced various multi-bladed, mulching mowers which include a plurality of blades suspended beneath a cutting deck. Each blade is contained inside a generally enclosed cutting chamber. A plurality of grass deflector members, similar to those shown in the Thorud 449 patent, are located inside each cutting chamber to assist in the downward deposition of grass when the mower is being used as a mulcher. However, this mower is not convertible to a grass discharge mode, but is a "dedicated" multi-bladed mulcher.

U.S. Pat. No. 4,226,074 to Mullet et al. discloses a multi-bladed cutting deck having a plurality of side-by-side, overlapping cutting chambers which are staggered fore-and-aft relative to one another. A single cutting blade is located in each cutting chamber. Grass is cut by the blades within each cutting chamber as the machine is driven over the ground. The grass clippings normally flow from a side cutting chamber on one side of the machine progressively through the other two cutting chambers, i.e. first through the middle cutting chamber and then through the side cutting chamber on the opposite side of the deck, to be discharged from the deck through a single side discharge outlet in the last mentioned side chamber. See FIG. 3 of Mullet et al. However, the side discharge outlet can be closed by a gate, and additional gates can be swung into closed positions between the chambers to isolate each cutting chamber from the others to prevent the flow of grass clippings between the cutting chambers. With the gates in these closed positions, the deck operates as a mulcher. See Col. 5 of Mullet et al.. Lines 49-57. There are no "kicker members" in any of the cutting chambers.

Thus, the Mullet et al. reference discloses a multi-bladed deck which is convertible between mulching and grass discharge/collection modes. Mullet discloses that a bagging attachment can be mounted on the mower to collect the grass clippings exiting from the side discharge outlet. However, in the grass discharge/collection mode, the Mullet device requires that the grass clippings flow through the interior of the cutting chambers from one side of the deck to the other to exit from the machine.

Grass clippings, particularly clippings from wet and long grass, tend to collect or stick to those cutting chamber surfaces with which they come into contact. Thus, the Mullet arrangement can result in undesirable build up of grass clippings inside the cutting chambers, i.e. in the middle cutting chamber and most especially in the second side cutting chamber having the grass discharge outlet, due to the need to pass all the clippings from all the cutting chambers through the middle and second side cutting chambers on their way to the outlet. In addition, the arrangement of cutting chambers and blade rotation directions shown in Mullet further require that the grass clippings flowing from one chamber to the next change direction quite sharply. This further exacerbates the grass clipping build up problem and detracts from the performance of the machine in its grass discharge/collection mode.

SUMMARY OF THE INVENTION

Accordingly, it is one aspect of the present invention to provide a multi-bladed mulching mower that may be used to cut relatively large areas of grass which mower is easily convertible between a grass mulching mode and a grass discharge/collection mode while minimizing undesirable grass build up in the cutting chambers or performance degradation.

A mower according to the present invention is selectively convertible between a grass mulching mode and a grass discharge/collection mode. The mower comprises a cutting deck which is movable over the ground. First and second cutting chambers are carried on the cutting deck in each of which at least one generally horizontal cutting blade is contained. The cutting blades are rotatable about a vertical axis to sever grass or the like. Each cutting chamber is substantially enclosed around the top and sides thereof, but is open at the bottom thereof, such that the grass clippings are contained within the cutting chamber until such time as they are driven downwardly out of the cutting chamber through the open bottom of the cutting chamber in the mulching mode of the mower. The first cutting chamber is provided with a selectively openable discharge outlet which is closed in the mulching mode of the mower but is opened in the discharge/collection mode of the mower to allow the grass clippings to be evacuated from the first cutting chamber through the discharge outlet when the discharge outlet is opened. In addition, the second cutting chamber has selectively openable means which is closed in the mulching mode of the mower but is opened in the discharge/collection mode of the mower for allowing the grass clippings circulating therein to exit therefrom and be deposited on the ground in advance of the first cutting chamber to be picked up and evacuated by the blade in the first cutting chamber as the first cutting chamber passes over the grass clippings deposited on the ground from the second cutting chamber.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
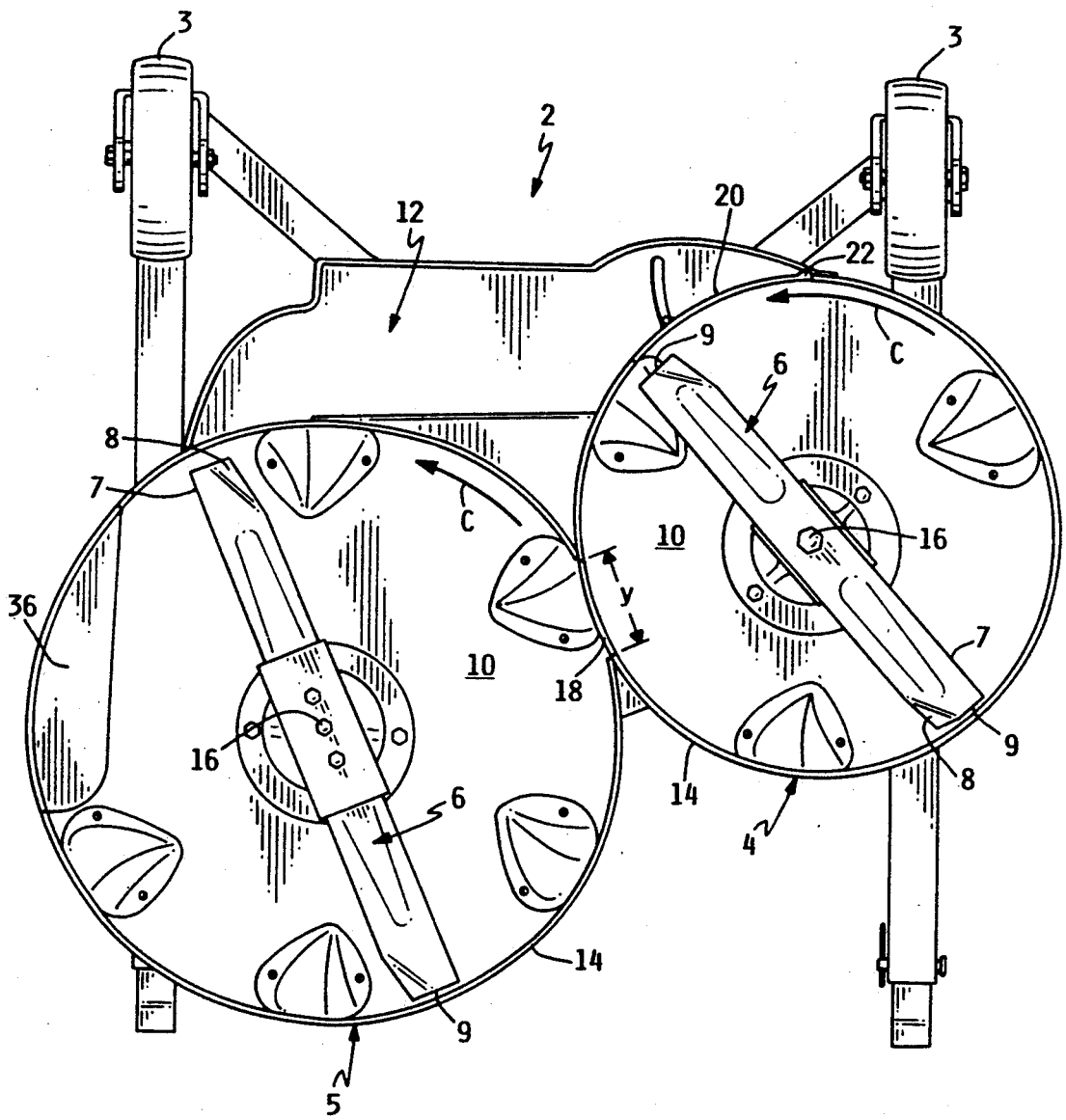
FIG. 1 is a bottom plan view of an improved mower according to the present invention, particularly illustrating a deck having multiple cutting blades and multiple cutting chambers, and further illustrating the cutting chambers of the deck being configured in the grass mulching mode.

FIG. 1 illustrates a mower according to the present invention which includes a cutting deck generally referred to as 2. Cutting deck 2 is supported for movement over the ground in any suitable manner known in the art. For example, deck 2 could be a self contained deck directly supported on the ground by various wheels 3 or, alternatively, could be an attachment to a traction unit (not shown) which suspends and carries deck 2 above the ground. In any event, cutting deck 2 shown herein has two side-by-side cutting chambers 4 and 5 that are staggered fore and aft relative to one another, i.e. cutting chamber 4 is placed somewhat forwardly of cutting chamber 5.

A generally horizontal cutting blade 6 is contained within each cutting chamber 4 and 5. Blade 6 has cutting edges 7 on opposed ends thereof. Each cutting edge 7 is followed by a grass elevating sail 8. In addition, each blade 6 has a pre-determined diameter defined by the length of the blade between the opposed tips 9 thereof.

As blades 6 are rotated within chambers 4 and 5, the blades have their cutting edges 7 brought into contact with standing stalks of grass to sever the grass at a particular height above the ground determined by the height of cutting deck 2 above the ground. The blade sails 8 then cause the grass to be circulated within the cutting chambers in a generally circumferential path identified by the arrows C. Blades 6 can have any appropriate configuration of cutting edges 7 and sails 8 which would allow the grass cutting and circulating actions just described to take place.

Looking at either cutting chamber 4 or 5 as shown in FIG. 1, each cutting chamber is bounded by a top wall portion 10 which is often simply a part of a larger upper wall 12 of cutting deck 2. In other words, the upper wall 12 of deck 2 is not necessarily coextensive with the area of chambers 4 and 5, but extends outwardly beyond the cutting chambers 4 and 5 in the manner shown in FIG. 1. The exact shape of the upper wall 12 of deck 2, and thus the overall shape of deck 2, can obviously vary from that shown in FIG. 1. However, the upper wall 12 of deck 2 provides the top wall portion 10 which encloses the top of each cutting chamber. The driving spindle 16 for blade 6 passes vertically down through such top wall portion 10 along the vertical axis of rotation of blade 6, but otherwise top wall portion 10 is substantially solid to confine the grass clippings within cutting chamber 4 or 5.

In addition to the top wall portion 10, each cutting chamber 4 and 5 includes a peripheral downwardly extending side wall or skirt 14 that extends approximately 360° to enclose the orbit or rotational path of blade tips 9. Chambers 4 and 5 intersect or abut for a small distance in the arc segment denoted as y. The peripheral chamber walls 14 are cut away at their lower edges over the distance y to form a window or aperture 18 that allows the tips of blades 6 in adjacent chambers 4 to come quite close together without contacting one another. However, this window or aperture 18 terminates slightly above the plane of the blades so that the grass clippings circulating in the paths C in chambers 4 and 5, which paths C are located above the plane of the blades, will be confined by the peripheral walls 14 without there being any substantial or significant transfer of clippings through the window or aperture.

Figure 2:
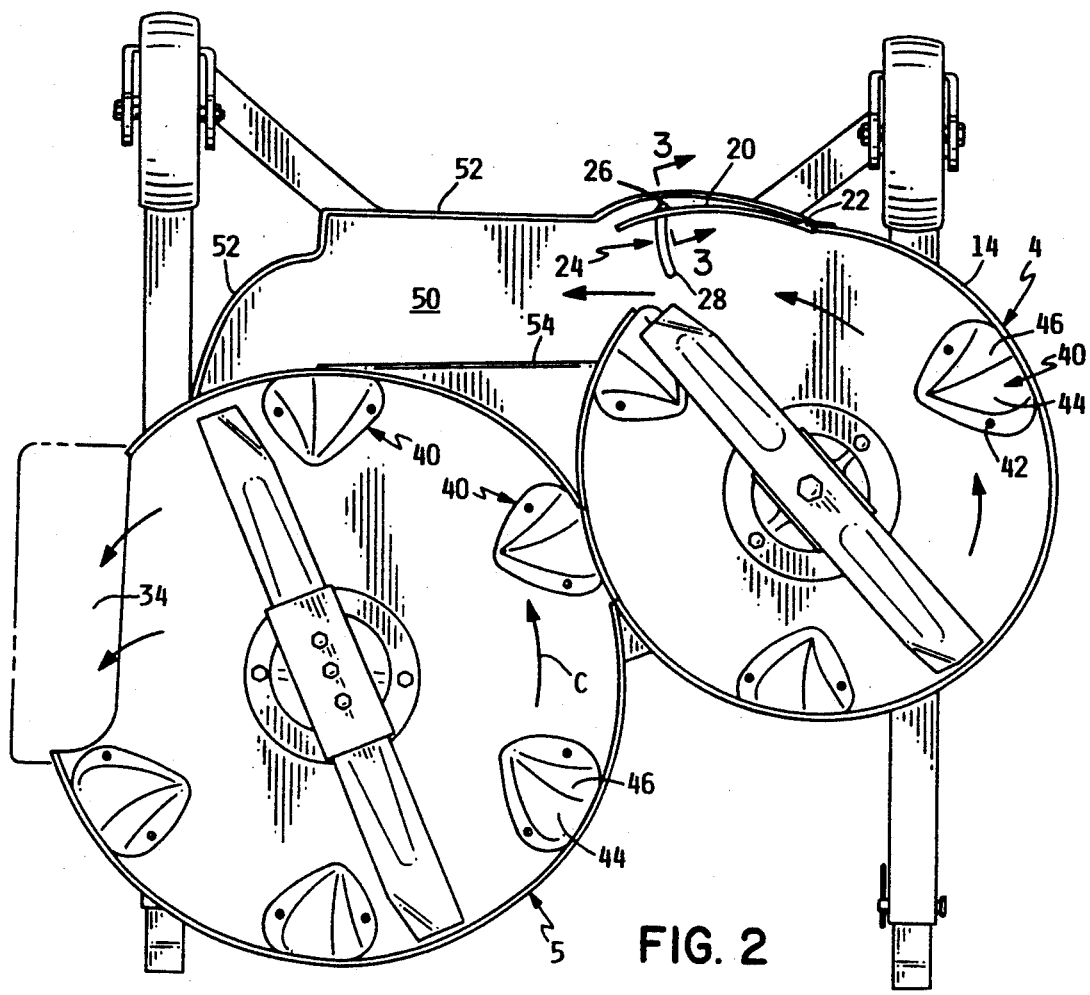
FIG. 2 is a bottom plan view similar to FIG. 1 of the improved mower according to the present invention, but illustrating the cutting chambers of the deck being configured in the grass discharge/collection mode.

A portion of the peripheral wall 14 of cutting chamber 4 is formed by a pivotal gate 20 which is pivotally journalled along a vertical pivot axis 22 to a portion of deck 2, i.e. either to top wall 12 or to an adjacent portion of peripheral wall 14 itself. Gate 20 is positioned forwardly of and adjacent to the other cutting chamber 5. Gate 20 is curved to match the curve of peripheral wall 14 and has a first closed position in which it fills out the shape of the peripheral wall such that wall 14 is substantially unbroken or solid. This closed position is shown in FIG. 1. In addition, gate 20 can be selectively swung or pivoted to an open position in which it forms a gap 24 in the peripheral wall 14 of cutting chamber 4, as shown in FIG. 2.

Figure 3:
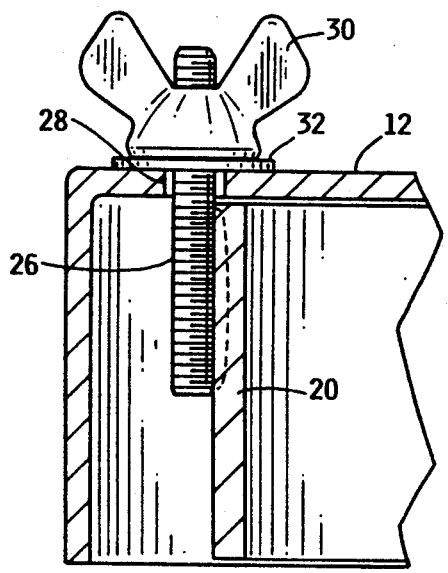
FIG. 3 is a cross-sectional view of a portion of the improved mower of the present invention taken along lines 3—3 in FIG. 2, particularly illustrating the pivotal gate which forms a portion of one of the cutting chambers of the deck and the means for locking that gate in an adjusted position.

Gate 20 can be selectively locked or held in either its open or closed position. As shown in FIG. 3, the gate locking means comprises a threaded bolt 26 which is fixedly attached to gate 20 and extends upwardly through an arcuate slot 28 in top wall 12 of cutting deck 2. A wing nut 30 or other suitable securing member is received on the top end of bolt 26 and bears against a washer 32 received around bolt 26. When wing nut 30 is tightened down against top wall 12 of deck 4, bolt 26 will be fixed in position to lock pivotal gate 20 in place.

The other cutting chamber 5 in deck 2 has a grass discharge outlet indicated generally as 34. This discharge outlet 34 may be selectively closed by any suitable closure member 36. When closure member 36 is in place, the top and peripheral walls 10 and 14 of cutting chamber 5 are unbroken or solid as shown in FIG. 1. However, when closure member 36 is removed as shown in FIG. 2, grass clippings can be discharged from cutting chamber 5 through the now open grass discharge outlet 34. Closure member 36 can comprise a plate or cover which is manually unbolted and removed from deck 2 to open up discharge outlet 34, or could comprise a pivotal plate or cover which is hinged in some way to deck 2 and can be selectively pivoted up out of the way to open up discharge outlet 34.

A bagging attachment (not shown) can be removably mounted on deck 2 to communicate with discharge outlet 34 when discharge outlet 34 is open, i.e. closure member 36 has been removed from deck 2 or has been swung out of the way. Thus, deck 2 can have a grass discharge mode in which the grass clippings are simply discharged to the side of deck 2 when outlet 34 is open, or a grass collection mode in which the grass clippings are collected in some type of bagging attachment associated with the outlet 34. For the purpose of this invention and in contrast to the grass bagging mode to be described shortly, it is irrelevant whether the outlet 34 has been opened up for grass discharge or collection purposes. Thus, the term discharge/collection mode will apply to that condition in which the grass discharge outlet 34 is open and includes both the grass discharge and collection modes that are possible when outlet 34 is open.

Referring now to the operation of the mower, the mower has a mulching mode in which the grass clippings are desirably driven downwardly and hidden in the cut grass path. Deck 2 is configured as illustrated in FIG. 1 in its mulching mode, i.e. pivotal gate 20 in cutting chamber 4 is locked in its closed position and grass discharge outlet 34 in cutting chamber 5 is closed by closure member 36. Thus, each cutting chamber 4 and 5 is substantially enclosed over the sides and top such that the grass clippings cut by blades 6 are retained and confined within chambers 4 and 5. These clippings are eventually deposited downwardly through the open bottom face of the cutting chambers into the cut grass path.

As shown herein, grass deflecting members are desirably located inside cutting chambers 4 and 5 to assist in the downward movement of clippings from the chambers and to allow the mower to function as a more effective mulcher. While the deflecting members are preferably used in each chamber to increase mulching effectiveness, they are not strictly necessary to the present invention. A mower covered by the present invention could be built without having any grass deflecting members in chambers 4 and 5.

The deflecting members are generally illustrated as 40 herein. A plurality of circumferentially spaced deflecting members 40 are used in each chamber. The deflecting members 40 include attachment flanges 42 which allow the deflecting members 40 to be bolted or otherwise secured to the top wall portion 10 of chamber 4 or 5 and to depend downwardly therefrom. The deflecting members are located above the plane of rotation of blade 6 in a position to intercept the grass clipping flow C in chambers 4 and 5.

Each deflecting member 40 includes triangular front and rear faces 44 and 46, respectively, which are angled downwardly relative to the top wall portion and are angled slightly inwardly relative to the peripheral wall 14. Grass clippings circulating in the path C will impact against front face 44 of deflecting member 40 to be deflected downwardly. This assists in causing the grass clippings to be evacuated out of chamber 4 or 5 through the open bottom thereof and to be forcefully driven or hidden in the cut grass path. U.S. Pat. No. 4,951,449 to Thorud is incorporated by reference with respect to the contsruction and operation of the deflecting members 40.

Referring now to FIG. 2, in the grass discharge/collection mode of deck 2, pivotal gate 20 in front cutting chamber 4 is swung out and locked in its open position and closure member 36 in the rearward cutting chamber 5 is removed or is swung out of the way to open up grass discharge outlet 34. Now, as deck 2 is moved over the ground and blades 6 cut grass, the clippings in front chamber 4 are thrown to the side through the gap 24 and are deposited onto the ground in advance of the rearward cutting chamber 5. In this regard, deck 2 is provided with an enclosed passage or pocket 50 formed by top wall 12 of deck 2, a front wall 52 on deck 2, and a rear interior wall 54. This pocket 50 is located in front of the rearward cutting chamber 5 to accommodate the flow of clippings from chamber 4 and to receive and confine these clippings such that they fall onto the ground in an area in advance of rearward cutting chamber 5 rather than having uncontrolled dispersion of the clippings. These clippings are then picked up by the blade 6 in the rearward cutting chamber 5 as blade 6 passes over them, are recut to some extent, and are evacuated with the other grass clippings being cut for the first time by blade 6 through the grass discharge outlet 34.

The mower of the present invention has some advantages over those known in the prior art. It is able to cut a wide swath of grass and either effectively mulch those clippings in a mulching mode or cause the clippings to be discharged into a bagging apparatus or through the grass discharge outlet in a discharge/collect ion mode. In the discharge/collection mode, the grass clippings are not directed from cutting chamber 4 into and through the interior of the other cutting chamber 5 in a grass path having sharp twists or turns. Thus, undesirable grass build up in chamber 5 is avoided. Instead, the grass clippings are simply discharged from the first chamber 4 in their normal direction of travel and are directed to a location in advance of the adjacent second chamber 5 for repickup, recutting and quick and efficient evacuation.

Preferably, cutting chamber 4 is of a smaller diameter than cutting chamber 5. Thus, the volume of clippings being deposited in front of chamber 5 to be picked up by chamber 5 is decreased somewhat than if chamber 4 were the same size as chamber 5. However, chamber 4 could be the same size, or even larger, than chamber 5 without departing from the present invention.

Blades 6 in chambers 4 and 5 both rotate in the same direction, i.e. in a counterclockwise fashion when viewed by looking at the underside of the deck as in FIGS. 1 and 2. However, blade 6 in cutting chamber could rotate counter to the direction of rotation of blade 6 in chamber 4 without departing from the present invention, although the location of discharge outlet 36 might then be changed to be in a different location on chamber 5.

Various modifications of this invention will be apparent to those skilled in the art. Thus, the scope of the invention is to be limited only by the appended claims.

We claim:

1. A multi-bladed mower which is selectively convertible between a grass mulching mode and a grass discharge/collection mode, which comprises:
   (a) a cutting deck which is movable over the ground;
   (b) first and second cutting chambers carried on the cutting deck in each of which at least one generally horizontal cutting blade is contained, the cutting blades being rotatable about a vertical axis to sever grass or the like, wherein each cutting chamber is substantially enclosed around the top and sides thereof, but is open at the bottom thereof, such that the grass clippings are contained within the cutting chamber until such time as they are driven downwardly out of the cutting chamber through the open bottom of the cutting chamber in the mulching mode of the mower;
   (c) wherein the first cutting chamber is provided with a selectively openable discharge outlet which is closed in the mulching mode of the mower but is opened in the discharge/collection mode of the mower to allow the grass clippings to be evacuated from the first cutting chamber through the discharge outlet when the discharge outlet is opened; and
   (d) wherein the second cutting chamber has selectively openable means which is closed in the mulching mode of the mower but is opened in the discharge/collection mode of the mower for allowing the grass clippings circulating therein to exit therefrom and be deposited on the ground in advance of the first cutting chamber to be picked up and evacuated by the blade in the first cutting chamber as the first cutting chamber passes over the grass clippings deposited on the ground from the second cutting chamber.

2. A mower as recited in claim 1, wherein each cutting chamber includes a top wall and a peripheral side wall which extends downwardly from the top wall, wherein the peripheral side wall substantially surrounds the blade and is relatively unbroken at the level of the grass clippings being circulated by rotation of the blade, and wherein the selectively openable means in the second cutting chamber comprises a pivotal gate located in the peripheral side wall of the second cutting chamber.

3. A mower as recited in claim 2, wherein the gate has a closed position in which the gate is aligned with the side wall to form an unbroken side wall and an open position in which the gate has been pivoted relative to the peripheral side wall to provide a gap therein through which the grass clippings can exit from the second cutting chamber.

4. A mower as recited in claim 3, wherein the first cutting chamber is located rearwardly of the second cutting chamber in the direction of travel of the deck, and wherein the pivotal gate is located in the second cutting chamber forwardly of the first cutting chamber such that clippings discharged through the gap provided by the open gate are directed in a sideways direction to fall on the ground in advance of the first cutting chamber.

5. A mower as recited in claim 4, wherein the deck includes means for receiving and confining the grass clippings discharged from the second cutting chamber to fall in an area in advance of the first cutting chamber.

6. A mower as recited in claim 5, wherein the receiving and confining means comprises an enclosed pocket located in advance of the first cutting chamber and to the side of the second cutting chamber.

7. A mower as recited in claim 3, further including means for locking the gate in either its open or its closed positions.

8. A mower as recited in claim 1, wherein the second cutting chamber and blade have a smaller diameter than the first cutting chamber and blade.

9. A mower as recited in claim 1, further including grass deflecting means located in each cutting chamber above the cutting blades to deflect grass clippings downwardly.

10. A multi-bladed mower which is selectively convertible between a grass mulching mode and a grass discharge/collection mode, which comprises:
   (a) a cutting deck which is movable over the ground, the cutting deck having an underside facing the ground;
   (b) at least first and second cutting chambers carried on the underside of the cutting deck, wherein the cutting chambers are located side-by-side with the first cutting chamber being staggered rearwardly from the second cutting chamber in the direction of travel of the deck;
   (c) a plurality of substantially horizontal cutting blades rotatably carried beneath the cutting deck spaced below the underside of the deck and above the ground, wherein at least one cutting blade is located within each of the first and second cutting chambers, and wherein each cutting chamber includes a peripheral side wall which substantially surrounds the blade and is relatively unbroken at the level of the grass clippings being circulated by rotation of the blade such that the grass clippings are contained within the cutting chamber until such time as they are driven downwardly out of the cutting chamber through an open bottom side of the cutting chamber in the mulching mode of the mower;
   (d) wherein the first cutting chamber is provided with a selectively openable discharge outlet which is closed in the mulching mode of the mower but is opened in the discharge/collection mode of the mower to allow the grass clippings to be evacuated from the first cutting chamber through the discharge outlet when the discharge outlet is opened; and (e) wherein the second cutting chamber has selectively openable means which is closed in the mulching mode of the mower but is opened in the discharge/collection mode of the mower for allowing the grass clippings circulating therein to exit therefrom and be deposited on the ground in advance of the first cutting chamber to be picked up and evacuated by the blade in the first cutting chamber as the first cutting chamber passes over the grass clippings deposited on the ground from the second cutting chamber, wherein the selectively openable means comprises a movable gate that forms a portion of the peripheral wall of the second cutting chamber which gate may be selectively moved between a closed position in which the gate is aligned with the side wall to form an unbroken side wall and an open position in which the gate has been moved relative to the peripheral side wall to provide a gap therein through which the grass clippings can exit from the second cutting chamber, and wherein the gate is located in the second cutting chamber forwardly of and adjacent to the first cutting chamber such that clippings exiting through the gap provided by the opened gate will travel sideways and fall on the ground in advance of the first cutting chamber.

11. A mower as recited in claim 10, wherein the deck includes means for receiving and confining the grass clippings discharged from the second cutting chamber to fall in an area in advance of the first cutting chamber.

12. A mower as recited in claim 11, wherein the receiving and confining means comprises an enclosed pocket located in advance of the first cutting chamber and to the side of the second cutting chamber.

13. A mower as recited in claim 12, wherein the pocket is formed by a top wall, front wall and rear wall of the deck which are located exteriorly of the first cutting chamber.

14. A mower as recited in claim 10, wherein the second cutting chamber and blade have a smaller diameter than the first cutting chamber and blade.

15. A mower as recited in claim 10, wherein the gate is pivotally secured to the deck for a pivoting motion between its open and closed positions.

16. A mower as recited in claim 10, wherein the first and second cutting chambers overlap and abut with one another, and wherein the peripheral walls of the cutting chambers are cut away in the area of the abutment to a level slightly above the plane of the blades to allow the blades to be spaced closer together than if the peripheral walls are not cut away.

17. A multi-bladed mower which includes a grass discharge/collection mode, which comprises:
 (a) a cutting deck which is movable over the ground;
 (b) first and second cutting chambers carried on the cutting deck in each of which at least one generally horizontal cutting blade is contained, the cutting blades being rotatable about a vertical axis to sever grass or the like;
 (c) wherein the first cutting chamber is provided with a discharge outlet which is open in the discharge-collection mode of the mower to allow the grass clippings to be evacuated from the first cutting chamber through the discharge outlet; and
 (d) wherein the second cutting chamber has means which is open in the discharge/collection mode of the mower for allowing the grass clippings circulating therein to exit therefrom and be deposited on the ground in advance of the first cutting chamber to be picked up and evacuated by the blade in the first cutting chamber as the first cutting chamber passes over the grass clippings deposited on the ground from the second cutting chamber.

18. A mower as recited in claim 17, wherein the first cutting chamber is located rearwardly of the second cutting chamber in the direction of travel of the deck, and wherein the open exit means is located in the second cutting chamber forwardly of the first cutting chamber such that clippings discharged through the open exit means are directed in a sideways direction to fall on the ground in advance of the first cutting chamber.

19. A mower as recited in claim 17, wherein the deck includes means for receiving and confining the grass clippings discharged from the second cutting chamber to fall in an area in advance of the first cutting chamber.

20. A mower as recited in claim 19, wherein the receiving and confining means comprises an enclosed pocket located in advance of the first cutting chamber and to the side of the second cutting chamber.

* * * * *